Patented Feb. 13, 1951

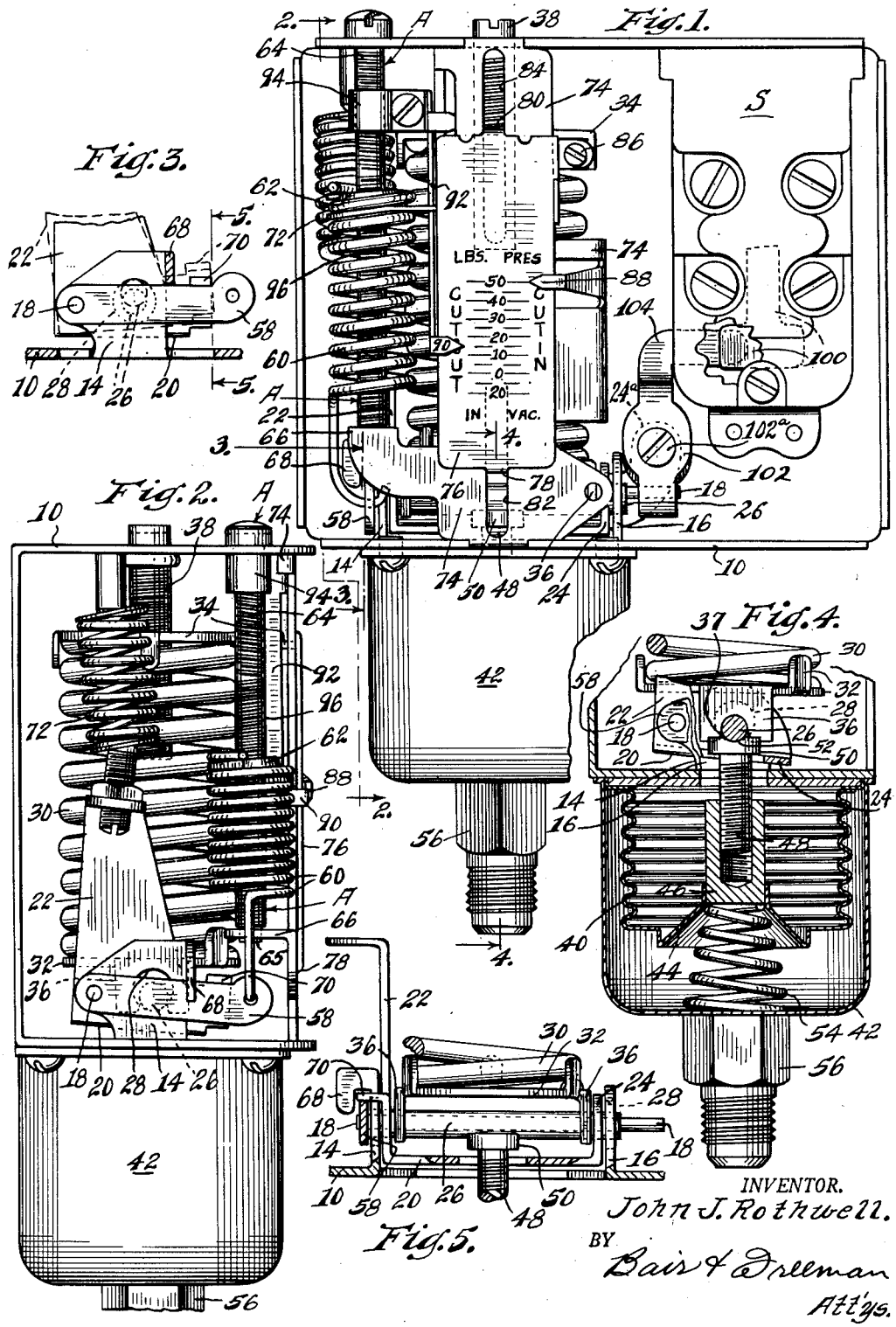

2,541,385

UNITED STATES PATENT OFFICE 2,541,385

CALIBRATION MECHANISM FOR CONTROLS

John J. Rothwell, Elkhart, Ind., assignor to Penn Electric Switch Co., Goshen, Ind., a corporation of Iowa Application September 18, 1947, Serial No. 774,775

4 Claims. (Cl. 267—1)

This invention relates to a mechanism for properly calibrating a control device such as an automatic switch.

One object of the invention is to provide a control switch with calibration means that has a single scale for cooperation with a pair of pointers, one of which indicates the cut-in point of the switch and the other the cut-out point thereof.

Another object is to provide calibration mechanism which includes a stationary pointer, a movable scale connected with the range spring adjustment mechanism, and a movable pointer connected with a differential adjusting mechanism, whereby when the range spring is adjusted the scale cooperates with the stationary pointer to indicate one limit of the control while at the same time the other limit of the control is indicated by the movable pointer, the movable pointer in turn being moved in relation to the stationary pointer whenever the differential spring is adjusted to change the setting thereof.

A further object is to provide calibration mechanism of this general character wherein the movable pointer is actuated in the proper direction by rotation of the screw that adjusts the differential spring, the pointer however being movable in an opposite direction from the direction of movement of the adjustable member of the spring and such opposite movement being effected by a special adjusting screw having right and left-hand threads on different portions thereof, one of the threads coacting with a spring seat for the differential spring and the other cooperating with the movable pointer.

With these and other objects in view, my invention consists in the construction, arrangement and combination of the various parts of my device whereby the objects contemplated are attained as hereinafter more fully set forth, pointed out in my claims and illustrated in the accompanying drawing, wherein:

Figure 1 is a front elevation of a switch structure to which my calibration mechanism has been applied.

Figure 2 is a sectional view on the line 2—2 thereof.

Figure 3 is a sectional view on the line 3—3 of Figure 1 showing the parts in a different position than that illustrated in the Figure 2.

Figure 4 is a sectional view on the line 4—4 of Figure 1 showing further details of construction of the control so that its operation can be explained, and Figure 5 is a detailed sectional view on the line 5—5 of Figure 3.

On the accompanying drawings I have used the reference numeral 10 to indicate a switch housing for an automatic switch of the pressure or temperature actuated variety. Within the switch housing 10, a pair of upstanding ears 14 and 16 provide a support for a pivot pin 18.

Pivoted on the pin 18 is a U-shaped arm having a web 20 and a pair of flanges 22 and 24. The switch arm 20—22—24 carries an actuating pin 26 which extends through enlarged openings 28 of the stationary ears 14 and 16.

The actuating pin 26 is propelled downwardly by a range spring 30 interposed between spring seats 32 and 34. The seat 32 has a pair of downturned ears 36 which are notched at 37 to rest on the top of the pin 26. The spring seat 34 is threaded on a range adjusting screw 38 which is rotatably and non-slidably mounted in the top of the housing 10.

Opposing the range spring 30 is a temperature or pressure actuated bellows 40 which is contained within a bellows housing 42. The upper edge of the bellows is sealed relative to the housing and the lower edge terminates in a head-plate 44 connected to a threaded sleeve 46. The sleeve 46 has threaded therein a screw 48 provided with a head 50 notched as at 52 to engage the under side of the actuating pin 26.

To keep the head 50 in engagement with the actuating pin 26, a spring 54 is enclosed within the bellows housing 42. The bellows housing has the usual pressure connection 56 whereby pressure introduced into the housing collapses the bellows 40 in proportion to the value of the introduced pressure in opposition to the range spring 30.

A differential widening means is provided in the form of a lever 58 pivoted on the pivot pin 18 and connected with the lower end of a differential spring 60. The upper end of the differential spring 60 is provided with a spring seat 62 into which is threaded a differential adjusting screw A. The screw A has a lower portion threaded in one direction as indicated at 96. This is the portion that is threaded in the spring seat 62. The lower end of the screw is reduced at 65 and rotates in a bracket 66.

The stationary ear 14 is provided with a stop lug 68 (see Figure 5) for the differential widening lever 58 when it assumes a position about midway between its limits of movement as shown by solid lines in Figure 3. The pin 26 at this time is substantially centered in the openings 28 as shown by dotted lines. The flange 22 of the switch arm 20—22—24 is provided with a lug 70 adapted to engage the differential widening lever for lowering it to the position in Figure 2, or disengage from it as shown by dash lines in Figure 3 for a purpose which will hereinafter be described. At that time the pin 26 is also in its dash line (upper) position.

A toggle spring 72 is provided for the switch arm 22 to insure its continued movement as it passes over-center and thus aid in positively moving the switch arm to one or the other limits of its movement. The foregoing described construction is for a control device to which my invention can be applied. Said invention will now be described in detail.

A stationary plate 74 is mounted at the front of the switch housing 10. The bracket 66 is an extension of this plate. A scale plate 76 is vertically slidable relative to the stationary plate 74 and is guided by lugs 78 and 80 at its lower and upper ends, slidable in slots 82 and 84 respectively of the stationary plate 74. The scale plate 76 is movable simultaneously with the spring follower 34, being connected therewith as by a screw 86.

A scale indicating for instance pounds pressure and inches of vacuum is provided on the scale plate 76 as shown in Figure 1. A pair of pointers 88 and 90 cooperate with the scale on the scale plate 76 to indicate cut-in and cut-out points at any adjustment of the range and/or differential springs. The pointer 88 is stationary, being formed as part of the stationary plate 74. The pointer 90 is movable, being formed on a vertical bar 92 terminating in a threaded nut 94 in which the upper portion 64 of the differential adjusting screw A is threaded. Such portion 64 is provided with a thread which is the reverse of the thread 96 so that as the spring seat 62 travels upwardly on the differential adjusting screw the nut 94 will travel downwardly, and likewise the pointer 90 will travel downwardly. Upward travel of the element 94 is limited by its striking the case 10 and upward movement of the element 62 is limited by its running against the threads 64.

The switch arm 20—22—24 has an ear 24a which is adapted to actuate a switch S causing it to assume one position when the parts are in the position of Figures 1, 2 and 4 and another position when in the dash line position of Figure 3. The operative connection between the switch S and the pin 26 comprises a lever 102 pivoted on the pin 18 and having a screw connection 102a and a right angle extension 104 adapted to engage a switch arm 100 for moving it in one direction or the other. The switch structure forms no part of my present invention and a valve or any other type of control device may be used instead of the switch.

*Practical operation*

In the operation of my switch structure when the pressure is low within the housing 42 the actuating arm 20—22—24 will assume the full line position of Figure 2 and the other parts will correspond to their positions as illustrated in this figure. As the pressure increases the actuating arm and the arm 58 will move to the position of Figure 3, the arm 58 being retained against the lug 70 by the differential spring 60. At about the mid-point in the travel of the pin 26 (full line position of Figure 3) the lever 58 will have engaged the stop lug 68 on the stationary bracket 14 so that upon further movement of the actuating arm 22—24 the spring 60 will not be imposed against the lug 70 thereof.

Just before the actuating arm reaches the dash line position of Figure 3 the switch element 100 will be tripped to its opposite position and ready for a decrease in pressure that reverses the direction of travel of the parts and finally results in the switch assuming its initial position of Figure 2 again. During such reversal of movement the lug 70 will first pick up the lever 58 as in the full line position of Figure 3 and thereafter further clockwise movement of the actuating lever and the lever 58 will result in the spring 60 tending to widen the differential of operation of the control.

The degree of widening depends upon the adjustment of the tension in the spring 60 which of course may be changed by rotating the adjusting screw A. In accordance with the scale on the scale plate 76 the switch S is so connected with the control mechanism that a rise in pressure causes the switch to cut in and a drop in pressure causes it to cut out. This arrangement of course may be reversed and control devices other than switches may be used without departing from the spirit of my present invention which has to do with the calibration mechanism for the control device.

The range of the control device can be adjusted in the normal manner by rotating the screw 38. This causes the scale plate 76 to move in relation to the stationary pointer 88 which is the reverse of most range adjustment indicators. Such an arrangement however permits the differential adjustment to also be indicated by means of the movable pointer 90 so that on the same scale both cut-in and cut-out can be read.

A change in the range of course lowers both the cut-in and cut-out points whereas a change in the tension of the differential spring 60 causes a widening of the differential as the tension increases which is indicated by the pointer 90 traveling downwardly. At the same time that it travels downwardly the spring seat 62 travels upwardly to cause an increase in the tension of the spring. Thus the adjustment of the spring is properly indicated on the scale plate by a pointer that moves in an opposite direction due to the adjusting screw A having a right hand thread and a left hand thread, one for the spring seat 62 and the other for the nut 94 of the pointer 90. This arrangement also eliminates the necessity of providing reversing linkage or other means to properly relate the movement of the pointer 90 in relation to the adjustment of the spring 60 and in relation to the scale on the scale plate 76 which of necessity must be in a pre-determined direction for properly indicating the range adjustment.

Some changes may be made in the construction and arrangement of the parts of my device without departing from the real spirit and purpose of my invention, and it is my intention to cover by my claims any modified forms of structure or use of mechanical equivalents which may be reasonably included within their scope.

I claim as my invention:

1. In a calibration mechanism for a control device having an actuating element, a power element for moving said actuating element in one direction, a range spring for moving said actuating element in the opposite direction, and a differential widening spring engaged by said actuating element for a part of its movement in one of said directions, an adjusting device for moving a spring seat at one end of said range spring toward or away from said power element in response to a change in adjustment, a scale movable with said spring seat, a stationary pointer in relation to which the movement of said scale indicates one limit of the control device, an adjusting screw for said differential widening spring, and a pointer carried by said adjusting screw, said adjusting screw having opposite threads, one for the differential widening spring and the other for said last mentioned pointer whereby adjustment of the spring in one direction results in movement of the pointer in the opposite direction so that it may cooperate with the same scale as the stationary pointer and indicate the other limit of the control device.

2. In a calibration mechanism for a control device having an actuating element, a power element for moving said actuating element in one direction, a range spring for moving said actuating element in the opposite direction, and a differential widening spring engaged by said actuating element for a part of its movement in one of said directions, an adjusting device for moving a spring seat at one end of said range spring toward or away from said power element in response to a change in adjustment, a scale movable with said spring seat, a stationary pointer in relation to which the movement of said scale indicates one limit of the control device, an adjusting screw for said differential widening spring, and a pointer carried by said adjusting screw for said differential spring and cooperating with the same scale as the stationary pointer to indicate the other limit of the control device.

3. In a control device having an actuating element, a power element for moving said actuating element, a range spring opposing said power element, an adjusting screw for said range spring and a differential widening spring resisting movement of said actuating element during a part only of its total movement during a cycle of operation of said control device, an adjusting screw for said differential widening spring, a scale moved by rotation of said first screw and a stationary pointer therefor for indicating the adjustment of said range spring, and a pointer cooperable with the same scale for indicating the adjustment of the differential spring, said last pointer being connected with said last adjusting screw, said last adjusting screw having oppositely inclined threads on different portions thereof, one of said threads cooperating with the differential spring for adjusting it and the other cooperating with said pointer for moving it simultaneously in the opposite direction.

4. In a control device having cut-in and cut-out limits, a power element and a range spring opposing said power element, said power element and said range spring cooperating to operate said control device between opposite control limits, an adjusting device movable to change the tension in said range spring, a stationary pointer, a scale movable with said adjusting device in relation to said stationary pointer for indicating one of said limits, differential widening spring picked up by an actuated element of said control device for a part only of the throw of said control device, means for adjusting said differential widening spring, means for calibrating said last spring comprising a pointer movable simultaneously with said means for adjusting said differential widening spring and cooperating with said scale for indicating the other of said limits.

JOHN J. ROTHWELL.

REFERENCES CITED

The following references are of record in the file of this patent:

UNITED STATES PATENTS

| Number | Name | Date |
| --- | --- | --- |
| 978,026 | Jaenichen | Dec. 6, 1910 |
| 1,791,896 | Henning | Feb. 10, 1931 |